United States Patent
Ohnari et al.

(10) Patent No.: US 9,815,713 B2
(45) Date of Patent: Nov. 14, 2017

(54) WATER SOFTENING DEVICE AND METHOD FOR REGENERATING ION EXCHANGE RESIN

(71) Applicant: Samsung Electronics Co., Ltd., Gyeonggi-do (KR)

(72) Inventors: Hiroto Ohnari, Kanagawa (JP); Keisuke Miyashiro, Kanagawa (JP); Takeshi Okazaki, Kanagawa (JP); Satoshi Yanase, Kanagawa (JP)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 0 days.

(21) Appl. No.: 15/104,210

(22) PCT Filed: Dec. 12, 2014

(86) PCT No.: PCT/KR2014/012274
§ 371 (c)(1),
(2) Date: Jun. 13, 2016

(87) PCT Pub. No.: WO2015/088278
PCT Pub. Date: Jun. 18, 2015

(65) Prior Publication Data
US 2016/0311700 A1    Oct. 27, 2016

(30) Foreign Application Priority Data

Dec. 13, 2013 (JP) .................. 2013-257726
Dec. 1, 2014 (JP) .................. 2014-243383
Dec. 12, 2014 (KR) ............. 10-2014-0179152

(51) Int. Cl.
C02F 1/42     (2006.01)
C02F 1/46     (2006.01)
B01J 49/75    (2017.01)
C02F 1/461    (2006.01)

(52) U.S. Cl.
CPC ................ C02F 1/42 (2013.01); B01J 49/75 (2017.01); C02F 1/4618 (2013.01); C02F 2001/422 (2013.01); C02F 2001/425 (2013.01); C02F 2201/46105 (2013.01); C02F 2303/16 (2013.01)

(58) Field of Classification Search
CPC .... C02F 1/42; C02F 1/4618; C02F 2001/422; C02F 2001/425; C02F 2303/16; C02F 2201/46105; B01J 49/75; B01J 49/0086
USPC ......................................... 521/26
See application file for complete search history.

(56) References Cited

FOREIGN PATENT DOCUMENTS

| | | | |
|---|---|---|---|
| JP | 2002-186973 | | 7/2002 |
| JP | 2002186973 A | * | 7/2002 |
| JP | 2003-326269 | | 11/2003 |
| JP | 2003326269 A | * | 11/2003 |
| JP | 2006-043549 | | 2/2006 |
| JP | 2006043549 A | * | 2/2006 |
| JP | 2008-068198 | | 3/2008 |
| JP | 2008068198 A | * | 3/2008 |
| KR | 10-2011-0098823 | | 9/2011 |
| KR | 20110098823 A | * | 9/2011 ............. B82Y 30/00 |

OTHER PUBLICATIONS

International Search Report dated Mar. 30, 2015 in connection with International Application No. PCT/KR2014/012274, 5 pages.
Written Option of the International Searching Authority dated Mar. 30, 2015 in connection with International Application No. PCT/KR2014/012274, 8 pages.

* cited by examiner

*Primary Examiner* — Michael M Bernshteyn (57) ABSTRACT

The present invention relates to a water softening device including: a resin chamber which has an ion exchange resin and softens hard water passing through the ion exchange resin; and electrodes which are arranged by placing the resin chamber therebetween and apply voltages to the resin chamber so as to soften the hard water, and which regenerates the ion exchange resin, wherein the ion exchange resin is a slightly acidic cation exchange resin and/or a weakly alkaline anion exchange resin. The present invention provides the water softening device capable of easily regenerating the ion exchange resin and repeating the softening-regenerating without using chemicals or the like while maintaining the performance of softening water, thereby enabling a continuous use thereof.

19 Claims, 7 Drawing Sheets

| | HARDNESS COMPONENT REMOVAL RATE | CURRENT PER UNIT VOLUME OF ION EXCHANGE RESIN |
|---|---|---|
| EMBODIMENT 1 | 90% | 12.5 A/L |
| EMBODIMENT 2 | 94% | 6.24 A/L |

FIG. 7

WATER SOFTENING DEVICE AND METHOD FOR REGENERATING ION EXCHANGE RESIN

CROSS-REFERENCE TO RELATED APPLICATION(S)

The present application claims priority under 35 U.S.C. §365 to International Patent Application No. PCT/KR2014/012274 filed Dec. 12, 2014, entitled "WATER SOFTENING DEVICE AND METHOD FOR REGENERATING ION EXCHANGE RESIN", and, through International Patent Application No. PCT/KR2014/012274, to Japanese Patent Application No. 2013-257726 filed Dec. 13, 2013, Japanese Application No. 2014-243383 filed Dec. 1, 2014, and Korean Patent Application No. 10-2014-0179152 filed Dec. 12, 2014, each of which are incorporated herein by reference into the present disclosure as if fully set forth herein.

TECHNICAL FIELD

The present invention relates to a water softening device and a method of regenerating an ion exchange resin.

BACKGROUND ART

A water softening device softens hard water, as disclosed in Patent Document 1, by passing the hard water through a cation exchange resin to adsorb hardness components, such as a calcium ion, a magnesium ion or the like, to the cation exchange resin, and then regenerates the cation exchange resin by inserting chemicals, such as sodium chloride and the like, into the cation exchange resin.

Because chemicals should be regularly purchased and inserted into the water softening device to regenerate the cation exchange resin of the water softening device, there is a problem in which costs and time are required.

The water softening device disclosed in Patent Document 2 includes a resin chamber having a cation exchange resin and an anion exchange resin and a pair of electrodes arranged by placing the resin chamber therebetween. The water softening device may regenerate the cation exchange resin without using chemicals and the like by applying a voltage to the resin chamber using the electrodes.

A principle in which the cation exchange resin is regenerated in the water softening device will be described.

Because the resin chamber of the water softening device has the cation exchange resin and the anion exchange resin, when the voltage is applied to the resin chamber by the pair of electrodes, water is decomposed between the cation exchange resin and the anion exchange resin, and thus a hydrogen ion and a hydroxide ion are generated.

In this case, the hydrogen ion is exchanged with hardness components, such as a calcium ion or a magnesium ion, adsorbed to the cation exchange resin to regenerate the cation exchange resin.

However, a strongly acidic cation exchange resin or a strongly alkaline anion exchange resin is used in the ion exchange resin used in the water softening device to efficiently adsorb hardness components contained in water, but there is a problem in that it is difficult to regenerate the ion exchange resin after the water is softened.

Because hardness components are easily adsorbed to the strongly acidic cation exchange resin, it is difficult to exchange between the hydrogen ions generated by water decomposition and the hardness components once the hardness components in water are adsorbed.

Also, although anions, such as a chloride ion, in water are easily adsorbed to the strongly alkaline anion exchange resin, it is difficult to exchange between the hydrogen ions generated by water decomposition and the anions once the anions are adsorbed.

RELATED ART DOCUMENT (Patent Document 1) Japanese Patent Application Laid-Open No. H7-232165
(Patent Document 2) Japanese Patent Application Laid-Open No. 2012-236171

DISCLOSURE

Technical Problem

The present invention is directed to providing a water softening device and a method of regenerating an ion exchange resin capable of maintaining a performance of softening water, easily regenerating the ion exchange resin without using chemicals and the like, and enabling continuous use of the ion exchange resin.

Technical Solution

One aspect of the present invention provides a water softening device including an ion exchange resin, resin chambers softening water passing through the ion exchange resin, and electrodes disposed between the resin chambers, softening the water by applying a voltage to the resin chambers, and regenerating the ion exchange resin, wherein the ion exchange resin is at least made of a slightly acidic cation exchange resin and a weakly alkaline anion exchange resin.

In this case, the water softening may mean the reduction of hardness components contained in the water.

Since the ion exchange resin is at least made of the slightly acidic cation exchange resin and the weakly alkaline anion exchange resin, the water softening device may soften the water and may easily facilitate the regeneration of the ion exchange resin after the softening of water.

This is because the slightly acidic cation exchange resin and the weakly alkaline anion exchange resin have the following characteristics.

The slightly acidic cation exchange resin may have characteristics in which a hydrogen ion generated by water decomposition is easily exchanged with adsorbed hardness components when compared to a strongly acidic cation exchange resin.

Also, the weakly alkaline anion exchange resin may have characteristics in which a hydrogen ion generated by water decomposition is easily exchanged with adsorbed anions in the water when compared to a strongly alkaline anion exchange resin.

Therefore, the water softening device according to the present invention may reduce the amount of hydrogen ions and hydroxide ions used for the regeneration of the ion exchange resin when compared to a water softening device using a conventional strongly acidic cation exchange resin or a strongly alkaline anion exchange resin, thereby shortening a regeneration time of the ion exchange resin and saving electric power.

The slightly acidic cation exchange resin and the weakly alkaline anion exchange resin may each have particle shapes and be mixed in the resin chambers, and a particle size of each of the slightly acidic cation exchange resin and the weakly alkaline anion exchange resin may preferably be from 100 μm to 500 μm.

Further, when the particle sizes of the slightly acidic cation exchange resin and the weakly alkaline anion exchange resin are greater than 500 μm, because the number of spots at which the slightly acidic cation exchange resin and the weakly alkaline anion exchange resin are in contact with each other is reduced, the decomposition of the water may become difficult.

Also, when the particle sizes of the slightly acidic cation exchange resin and the weakly alkaline anion exchange resin are less than 100 μm, the decomposition of the water may become easy, but a pressure loss may easily occur when water passes.

Therefore, the particle sizes of the slightly acidic cation exchange resin and the weakly alkaline anion exchange resin may preferably be from 100 μm to 400 μm, or most preferably be from 250 μm to 400 μm.

In this case, the particle size may refer to a maximum length from a point of an external edge of a particle-shaped slightly acidic cation exchange resin or a particle-shaped weakly alkaline anion exchange resin to an opposite point thereof.

As an embodiment remarkably showing the effect of the present invention, an ion-exchange capacity of the slightly acidic cation exchange resin may preferably be one to nine times an ion-exchange capacity of the weakly alkaline anion exchange resin.

This is because, when the ion-exchange capacity of the slightly acidic cation exchange resin is less than one times the ion-exchange capacity of the weakly alkaline anion exchange resin, an absolute quantity per unit volume of the slightly acidic cation exchange resin in the resin chamber may be reduced, and the performance as the water softening device may be degraded.

Meanwhile, when the ion-exchange capacity of the slightly acidic cation exchange resin becomes greater than nine times the ion-exchange capacity of the weakly alkaline anion exchange resin, the number of the spots at which the slightly acidic cation exchange resin and the weakly alkaline anion exchange resin are in contact with each other is reduced, and thus the performance of the regeneration may be degraded.

Also, when the ion-exchange capacity of the slightly acidic cation exchange resin becomes greater than nine times the ion-exchange capacity of the weakly alkaline anion exchange resin, a neutralization reaction on a hydrogen ion is performed by hydroxide ions in the resin chamber being excessive during the regeneration, and thus the regeneration performance may be degraded.

Therefore, the ion-exchange capacity of the slightly acidic cation exchange resin may preferably be three to nine times the ion-exchange capacity of the weakly alkaline anion exchange resin.

Also, a plurality of resin chambers may be installed, in this case, electrodes may be disposed by spacing the plurality of resin chambers therebetween, a conductive member may be further included between each of the plurality of resin chambers, and thus the ion exchange resin may be regenerated for each unit divided by the electrodes and the conductive members.

Also, the conductive members may have non-permeability to water or non-permeability to ions.

The resin chamber may be formed by being divided by an anion exchange resin membrane installed on an anode side of the electrodes and a cation exchange resin membrane installed on a cathode side thereof, and may include passages in which water flows to an anode chamber, which is a space between an anode or the conductive member and the anion exchange resin membrane, from the resin chamber and a passage through which the water flows to the cathode chamber, which is a space between a cathode or the conductive member and the cation exchange resin membrane, from the anode chamber.

Also, a method of regenerating an ion exchange resin according to the present invention includes applying a voltage to electrodes arranged by placing a plurality of resin chambers accommodating an ion exchange resin and a conductive member installed between the plurality of corresponding resin chambers therebetween, regenerating an ion exchange resin by passing water between the resin chambers, and regenerating an ion exchange resin for each unit divided by the conductive member.

The resin chambers are formed by being divided by an anion exchange resin membrane installed on an anode side of the electrodes and a cation exchange resin membrane installed on a cathode side thereof, and water passes through the resin chambers to regenerate the ion exchange resin, passes from the resin chamber toward an anode chamber, which is a space between the anion exchange resin membrane and the conducive member or an anode, and passes from the anode chamber toward a cathode chamber, which is a space between the anion exchange resin membrane and a cathode or the conductive member.

Advantageous Effects

According to the present invention, the water softening device can easily regenerate an ion exchange resin, can maintain the performance of softening water, and can be continuously used without chemicals and the like by repeating the water softening-regeneration.

MODES OF THE INVENTION

Hereinafter, embodiments of the water softening device according to the present invention will be described with reference to the drawings.

Figure 1:
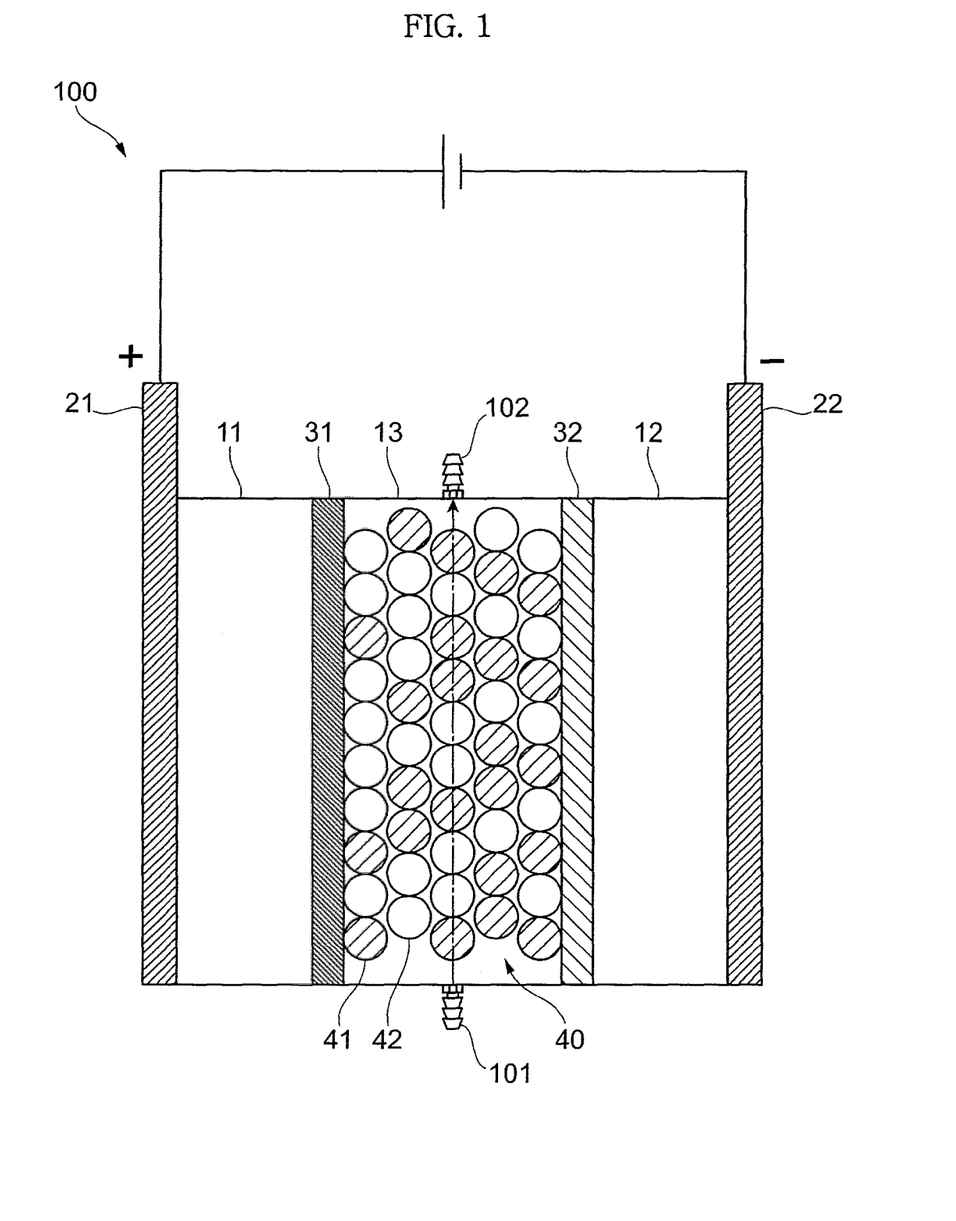
FIG. 1 is an exemplary view of a water softening device according to one embodiment.

FIG. 1 is an exemplary view of a water softening device according to one embodiment.

As shown in FIG. 1, a water softening device 100 includes a resin chamber 13 including an introduction port 101 into which water containing hardness components is introduced, a discharge port 102 through which generated water softened from the hard water is discharged, and a first electrode and a second electrode that are the pair of electrodes arranged by placing the resin chamber 13 therebetween.

Here, the first electrode is an anode 21, and the second electrode is a cathode 22.

The anode 21 and the cathode 22 that are the pair of electrodes in the embodiment face each other, and when a predetermined voltage is applied, any one of the electrodes becomes the anode 21 and the other electrode simultaneously becomes the cathode 22. In this case, a predetermined electric current flows in the resin chamber 13 from the anode 21 toward the cathode 22.

Here, in the anode 21 and the cathode 22, a predetermined titanium base material and the like may be coated with platinum, an alloy containing platinum, and an alloy containing platinum metals as a main component.

Also, the anode 21 and the cathode 22 may have a mesh shape and a planar shape.

The water softening device of the embodiment may freely change a magnitude of an electric current flowing into the resin chamber 13 by changing a voltage to the electrodes.

The water softening device 100 of the embodiment may include an anode chamber 11, the resin chamber 13, and a cathode chamber 12 that are separated in a direction of the electric current flowing into the resin chamber 13.

In this case, the resin chamber 13 and the anode chamber 11 are separated by a first diaphragm 31, and the resin chamber 13 and the cathode chamber 12 are separated by a second diaphragm 32.

The first diaphragm 31 may be an anion exchange resin membrane, and the second diaphragm 32 may be a cation exchange resin membrane.

In this case, the anion exchange resin membrane and the cation exchange resin membrane are not particularly limited to a specific material as long as the material has an anion exchange function and a cation exchange function.

In this case, when the voltage is applied to the anode 21 and the cathode 22, the first diaphragm 31, which is the anion exchange resin membrane, allows anions to selectively pass therethrough.

Also, the second diaphragm 32, which is the cation exchange resin membrane, allows cations to selectively pass therethrough.

The anion exchange resin membrane and the cation exchange resin membrane preferably have a balance between a mechanical strength and an ion permeability of from 10 μm to 300 μm, or more preferably from 50 μm to 150 μm.

The resin chamber 13 includes an ion exchange resin 40. The water introduced into the resin chamber 13 passes through the ion exchange resin 40 to be softened and is discharged as generated water.

More specifically, the resin chamber 13 is configured so that the water passing through the resin chamber 13 flows generally in a direction perpendicular to the electric current flowing in the resin chamber 13.

That is, the resin chamber 13 is configured so that the water flows toward the discharge port 102 installed at an upper portion of the resin chamber 13 from the introduction port 101 installed at a lower portion of the resin chamber 13.

The ion exchange resin 40 is made of any one of a slightly acidic cation exchange resin 41 and a weakly alkaline anion exchange resin 42.

In other words, the resin chamber 13 accommodates, for example, a slightly acidic cation exchange resin 41 containing a carboxylic group as an exchange group and a weakly alkaline anion exchange resin 42 containing primary to tertiary amino groups as an exchange group.

More specifically, the slightly acidic cation exchange resin 41 and the weakly alkaline anion exchange resin 42, each of which having a particle shape, are mixed and accommodated in the resin chamber 13.

The slightly acidic cation exchange resin 41 and the weakly alkaline anion exchange resin 42 are randomly mixed with each other in the resin chamber 13.

More specifically, each of the slightly acidic cation exchange resin 41 and the weakly alkaline anion exchange resin 42 has a particle size of from 100 μm to 500 μm.

Preferably, the particle sizes of the slightly acidic cation exchange resin 41 and the weakly alkaline anion exchange resin 42 may be from 100 μm to 400 μm.

Most preferably, the particle sizes of the slightly acidic cation exchange resin 41 and the weakly alkaline anion exchange resin 42 may be from 250 μm to 400 μm.

Each of the slightly acidic cation exchange resin 41 and the weakly alkaline anion exchange resin 42 has a generally spherical shape. The slightly acidic cation exchange resin 41 and the weakly alkaline anion exchange resin 42 may have generally a spherical shape and have diameters of from 100 μm to 500 μm, and the particle sizes of the slightly acidic cation exchange resin 41 and the weakly alkaline anion exchange resin 42 may be provided according to size.

In a ratio of the slightly acidic cation exchange resin 41 to the weakly alkaline anion exchange resin 42 in the resin chamber 13, the ion-exchange capacity of the slightly acidic cation exchange resin 41 may be one times or more the ion-exchange capacity of the weakly alkaline anion exchange resin 42.

Further, in the embodiment, the ion-exchange capacity of the slightly acidic cation exchange resin 41 is one to nine times the ion-exchange capacity of the weakly alkaline anion exchange resin 42.

An operation of the water softening device 100 will be described.

First, the water softening device receives water, prepared at a hardness of 250 mg/L as $CaCO_3$ during a water softening process, through the introduction port 101.

The water introduced into the water softening device passes through the ion exchange resin 40 of the resin chamber 13. In this case, the voltage is not applied to the anode 21 and the cathode 22 that are the pair of electrodes.

Therefore, hardness components contained in the water, such as a calcium ion, a magnesium ion or the like, are adsorbed to the slightly acidic cation exchange resin 41 to be reduced, and the water may be softened.

The water softening device performs the water softening process once or several times, and when the ion exchange resin 40 is regenerated, applies the predetermined voltage to the anode 21 and the cathode 22 that are the pair of electrodes and simultaneously receives the water prepared at the hardness of 250 mg/L as $CaCO_3$ from the introduction port 101.

In this case, a hydrogen ion and a hydroxide ion are formed on an interface of the slightly acidic cation exchange resin 41 and the weakly alkaline anion exchange resin 42 by the decomposition of the water.

The hardness components, such as a calcium ion, a magnesium ion, or the like, adsorbed to the slightly acidic cation exchange resin 41 are exchanged with the hydrogen ion, and anion components, such as a sulfate ion, a carbonate ion, or the like, adsorbed to the weakly alkaline anion exchange resin 42 are exchanged with the hydroxide ion, and thus the ion exchange resin 40 is regenerated.

But it is preferable that a length of a passage in the resin chamber 13 be as short as possible to suppress leftover hardness components or anion components from readsorbing to the ion exchange resin 40.

Figure 2:
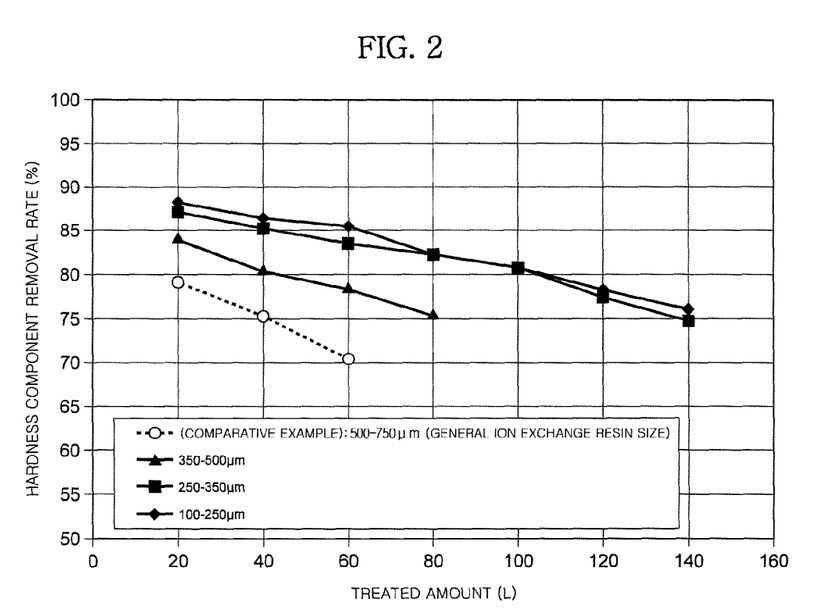
FIG. 2 is an experimental result showing a relation between a particle size of an ion exchange resin of the water softening device according to one embodiment and a hardness component removal rate of the ion exchange resin.
Figure 3:
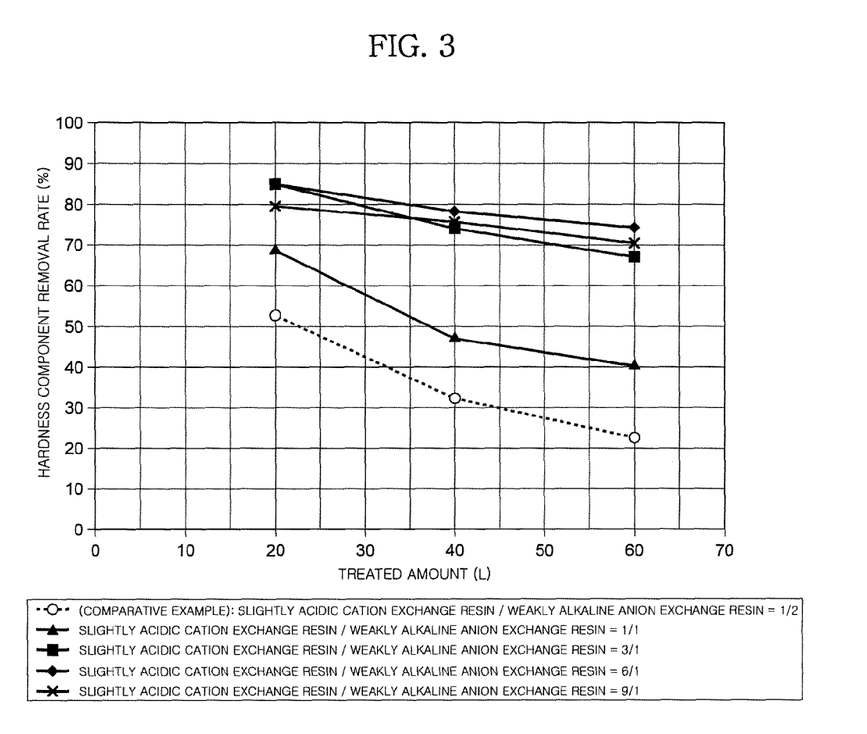
FIG. 3 is an experimental result showing a relation between an ion exchange capacity of the water softening device according to one embodiment and the hardness component removal rate of the ion exchange resin.

Next, experimental data showing a relation between the particle size of the ion exchange resin 40 and a hardness component removal rate when water softening-regeneration is repeated three times and then water softening is performed and a ratio of the slightly acidic cation exchange resin 41 to the weakly alkaline anion exchange resin 42 is 1:9 is shown in FIG. 2. Experimental data showing a hardness component removal rate and an ion exchange capacity ratio of the slightly acidic cation exchange resin 41 to the weakly alkaline anion exchange resin 42 when water softening-regeneration is repeated three times and water softening is performed when the particle size of the ion exchange resin 40 is 500 μm is shown in FIG. 3.

As shown in FIG. 2, when each of the particle sizes of the slightly acidic cation exchange resin 41 and the weakly alkaline anion exchange resin 42 is from 100 μm to 500 μm, the hardness component removal rate of the ion exchange resin 40 is higher than a case where a general size of the ion exchange resin 40 is from 500 μm to 750 μm.

Because when each of the particle sizes of the slightly acidic cation exchange resin 41 and the weakly alkaline anion exchange resin 42 is in the range of 100 μm to 500 μm, the number of spots at which the slightly acidic cation exchange resin 41 and the weakly alkaline anion exchange resin 42 are in contact with each other are increased, and thus water decomposition is facilitated.

But when the particle size is less than 100 μm, each of the ports 101 and 102, meshes attached thereto and the like are blocked, and thus a pressure loss is generated.

Also, it is preferable that the slightly acidic cation exchange resin 41 and the weakly alkaline anion exchange resin 42 be mixed so that a ratio of the slightly acidic cation exchange resin 41 is as high as possible in consideration of a performance of softening water.

Therefore, an absolute quantity per unit volume of the slightly acidic cation exchange resin 41 is increased, and thus water softening may be facilitated.

As shown in FIG. 3, the hardness removal performance is excellent when the ion-exchange capacity of the slightly acidic cation exchange resin 41 is one to nine times the ion-exchange capacity of the weakly alkaline anion exchange resin 42, and the hardness removal performance is extremely excellent especially when the ion-exchange capacity of the slightly acidic cation exchange resin 41 is three to six times the ion-exchange capacity of the weakly alkaline anion exchange resin 42.

According to the water softening device 100, the ion exchange resin 40 is formed of any one of the slightly acidic cation exchange resin 41 and the weakly alkaline anion exchange resin 42 to soften water flowing into the resin chamber 13 and increase a removal rate of the hardness components adsorbed on the ion exchange resin 40, and the water is softened without using chemicals and the like and the ion exchange resin 40 is easily regenerated, and thus the water softening device can be continuously used.

Also, the water softening device 100 is not limited to the form shown in FIG. 1.

Figure 4:
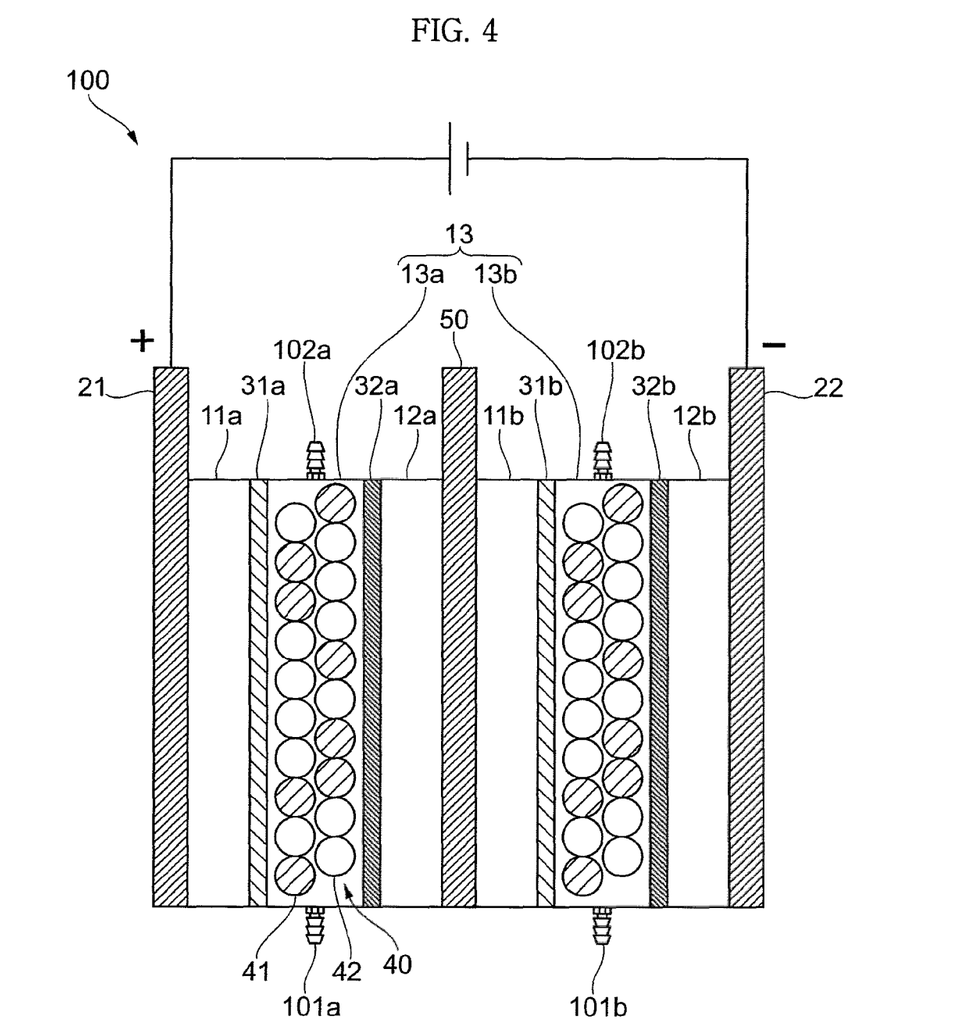
FIG. 4 is an exemplary view of a water softening device according to another embodiment.

FIG. 4 is another exemplary drawing of the water softening device 100.

The water softening device 100 in FIG. 4 is the same in terms of including the anode 21 and the cathode 22 that are the pair of electrodes arranged by placing the resin chamber therebetween when compared to the water softening device 100 in FIG. 1.

Also, the water softening device 100 in FIG. 4 is the same in terms of having the anode chamber 11 between the anode 21 and the resin chamber 13 adjacent thereto and the cathode chamber 12 between the cathode 22 and the resin chamber 13 adjacent thereto when compared to the water softening device 100 shown in FIG. 1.

For the convenience of description, these are shown as an anode chamber 11a and a cathode chamber 12b, respectively.

The water softening device 100 of another embodiment is different from the water softening device of the previous embodiment in terms that a plurality of resin chambers 13 are installed.

FIG. 4 shows a case in which two resin chambers 13 are installed as an example.

The two resin chambers 13 are shown in FIG. 4 as a resin chamber 13a and a resin chamber 13b.

The water softening device 100 of another embodiment includes, specifically, a conductive member 50, which will be described below, installed between the plurality of resin chambers 13 when compared to the water softening device 100 described in FIG. 1.

The conductive member 50 divides a space between the resin chambers 13 adjacent to each other into the anode chamber 11 and the cathode chamber 12.

The conductive member 50 in the embodiment of FIG. 4 divides a space between the resin chamber 13a and the resin chamber 13b.

The conductive member 50 divides the space into a cathode chamber 12a, which is a space between the resin chamber 13a and the conductive member 50, and an anode chamber 11b, which is a space between the conductive member 50 and the resin chamber 13b.

The resin chamber 13a is separated from adjacent spaces by a first diaphragm 31a and a second diaphragm 32a installed by placing the resin chamber 13a therebetween.

The resin chamber 13b is separated from adjacent spaces by a first diaphragm 31b and a second diaphragm 32b installed by placing the resin chamber 13b therebetween.

That is, the anode chamber 11a and the resin chamber 13a are separated by the first diaphragm 31a, and the resin chamber 13a and the cathode chamber 12a are separated by the second diaphragm 32a.

Also, the anode chamber 11b and the resin chamber 13b are separated by the first diaphragm 31b, and the resin chamber 13b and the cathode chamber 12b are separated by the second diaphragm 32b.

Here, the first diaphragms 31a and 31b may be anion exchange resin membranes, and the second diaphragms 32a and 32b may be cation exchange resin membranes.

The resin chamber 13a and the resin chamber 13b have the ion exchange resin 40 therein.

The ion exchange resin 40 is the same as in FIG. 1 at least in terms of being made of the slightly acidic cation exchange resin 41 and the weakly alkaline anion exchange resin 42.

Also, the particle sizes of the slightly acidic cation exchange resin 41 and the weakly alkaline anion exchange resin 42 or the ratio of the slightly acidic cation exchange resin 41 to the weakly alkaline anion exchange resin 42 in the resin chamber 13 may be the same as in the above-described case.

The conductive member 50 may be a conductive material.

The conductive member 50 has conductivity, at least has non-permeability to water and non-permeability to ions, and may have a tolerance to an anodic polarization and a cathodic polarization in the water.

Specifically, the conductive member 50 is, for example, a plate made of a metal material, and a predetermined titanium base material surface may be coated with platinum, an alloy containing platinum, or an alloy containing platinum metals as a main component.

Next, an operation of the water softening device 100 of another embodiment will be described.

When a water softening process is performed in the water softening device 100 of another embodiment, a voltage is not applied to the anode 21 and the cathode 22 similar to in the water softening device 100 of FIG. 1.

Water to be treated, which is hard water and a target of water softening of another embodiment, is divided into two, and the divided water to be treated is partially introduced into the resin chamber 13*a* from an introduction port 101*a* installed at a lower portion of the resin chamber 13*a*.

Also, the remaining water to be treated is introduced into the resin chamber 13*b* from an introduction port 101*b* installed at a lower portion of the resin chamber 13*b*.

The water passes from the lower portion toward an upper portion in each of the resin chamber 13*a* and the resin chamber 13*b*, hard components are removed by the ion exchange resin 40, and thus the introduced water to be treated may be softened.

Also, the softened water is discharged as generated water through each of a discharge port 102*a* installed at the upper portion of the resin chamber 13*a* and a discharge port 102*b* installed at the upper portion of the resin chamber 13*b*.

Also, when the ion exchange resin 40 is regenerated, a voltage is applied to the anode 21 and the cathode 22.

Like the water softening process, water the same as the water to be treated is introduced into the resin chamber 13*a* from the introduction port 101*a* and is simultaneously introduced into the resin chamber 13*b* from the introduction port 101*b*.

In this case, a hydrogen ion and a hydroxide ion are generated by water decomposition, and hardness components adsorbed on the slightly acidic cation exchange resin 41 are exchanged with the hydrogen ion.

Also, anion components adsorbed on the weakly alkaline anion exchange resin 42 are exchanged with the hydroxide ion, and the ion exchange resin 40 is regenerated.

In this case, a predetermined voltage is applied to the anode 21 and the cathode 22, and the conductive member 50 is polarized to become a bipolar electrode.

That is, a side of the anode 21 of the conductive member 50 forms a negative electrode, and a side of the cathode 22 of the conductive member 50 forms a positive electrode.

As the conductive member 50 becomes the bipolar electrode, water decomposition is also performed on a surface of the conductive member 50.

Also, when the second diaphragm 32*a* is the cation exchange resin membrane, the hardness components in the resin chamber 13*a*, such as a calcium ion and the like, pass through the second diaphragm 32*a* to be easily discharged toward the cathode chamber 12*a*, but it is difficult for the anion components to pass through the second diaphragm 32*a*. That is, an electrical dialysis effect occurs.

When the conductive member 50 becomes the bipolar electrode, since a side of the second diaphragm 32*a* is a negative electrode, the conductive member 50 may attract the hardness components, which are cations. Therefore, the hardness components are more efficiently and easily discharged toward the cathode chamber 12*a* from the resin chamber 13*a*.

That is, a chance of the hardness components being readsorbed to the ion exchange resin 40 is further reduced to improve a regeneration efficiency of the ion exchange resin 40.

Figure 5:
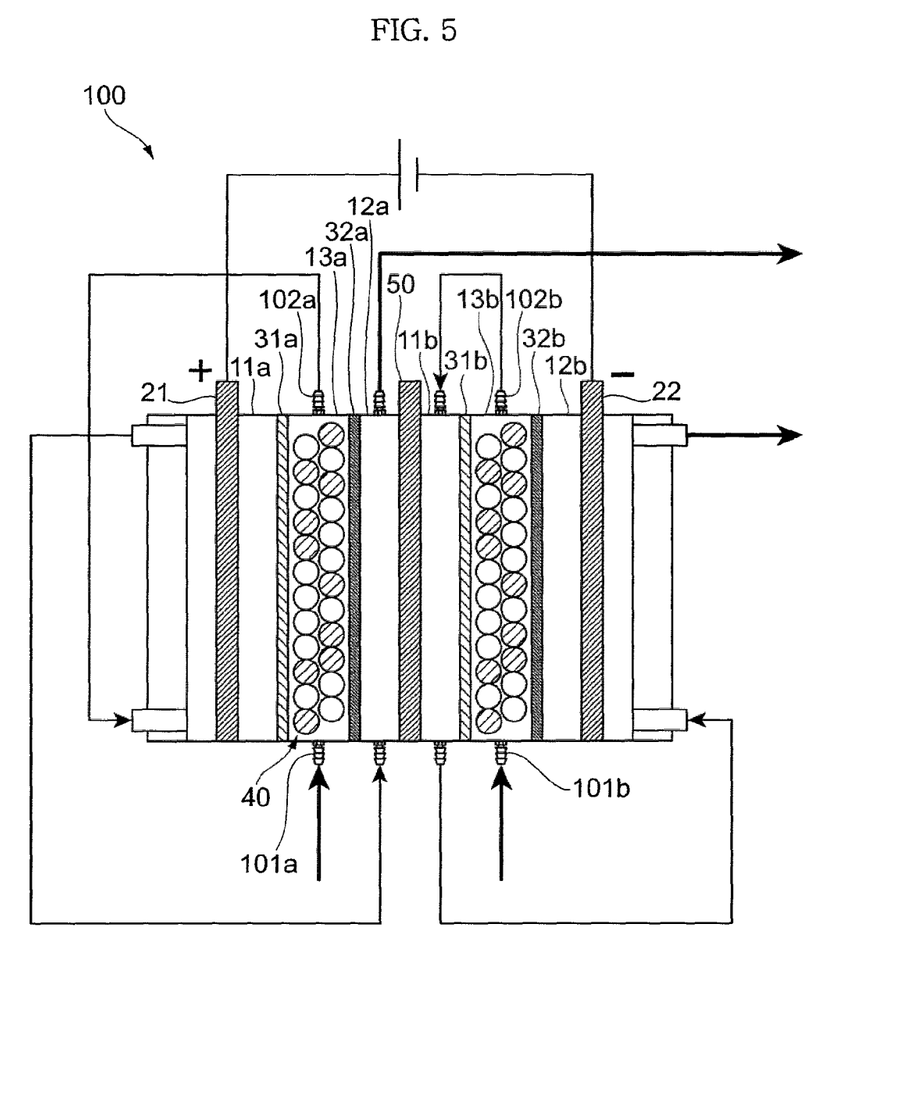
FIG. 5 is an explanatory drawing for a water flow route in the water softening device shown in FIG. 4.

A flow route of water when the ion exchange resin 40 of the water softening device of another embodiment is regenerated is preferably as follows.

FIG. 5 is a view describing a flow route of water in the water softening device 100 described in FIG. 4.

First, water introduced into the resin chamber 13*a* from the introduction port 101*a* and discharged from the discharge port 102*a* is introduced into a lower portion of the anode chamber 11*a*.

The water introduced into the lower portion of the anode chamber 11*a* is discharged toward an upper portion of the anode chamber 11*a* and is introduced into a lower portion of the cathode chamber 12*a*.

The water introduced into the lower portion of the cathode chamber 12*a* is discharged into an upper portion of the cathode chamber 12*a*.

Also, the water introduced into the resin chamber 13*b* from the introduction port 101*b* and discharged from the discharge port 102*b* is introduced into an upper portion of the anode chamber 11*b*.

The water introduced into the upper portion of the anode chamber 11*b* is discharged from a lower portion of the anode chamber 11*b* and introduced into a lower portion of the cathode chamber 12*b*.

The water introduced into the lower portion of the cathode chamber 12*b* is discharged to an upper portion of the cathode chamber 12*b*.

That is, a passage through which water flows to the anode chamber 11*a*, which is a space between the anode 21 and the first diaphragm 31*a*, from the resin chamber 13*a* and a passage through which water flows to the cathode chamber 12*a*, which is a space between the conductive member 50 and the second diaphragm 32*a*, from the anode chamber 11*a* are installed in the water softening device of another embodiment.

The water flows through the resin chamber 13*a*, regenerates the ion exchange resin, and passes through the passage.

Also, a passage through which water flows to the anode chamber 11*b*, which is a space between the conductive member 50 and the first diaphragm 31*b*, from the resin chamber 13*b* and a passage through which water flows to the cathode chamber 12*b*, which is a space between the cathode 22 and the second diaphragm 32*b*, from the anode chamber 11*b* are installed in the water softening device of another embodiment.

The water passes through the resin chamber 13*b*, regenerates the ion exchange resin, and passes through the passage.

Therefore, the ion exchange resin is regenerated for each unit (block) separated by the anode 21 and the cathode 22, which are electrodes, and the conductive member 50.

Also, the flow route of the water described in FIG. 5 may be applied to the water softening device 100 described in FIG. 1.

In this case, for example, water is first introduced into the resin chamber 13 from the introduction port 101 and is discharged to the discharge port 102.

Next, the water is introduced into a lower portion of the anode chamber 11.

The water is discharged from an upper portion of the anode chamber 11 and introduced into a lower portion of the cathode chamber 12 again, and then the water is discharged into an upper portion of the cathode chamber 12.

In this case, when the water is introduced and discharged, the upper portion and the lower portion of each chamber are designated, but the upper portion and the lower portion may be conversely designated.

Also, the present invention is not limited to the embodiment.

For example, the resin chamber of the embodiment has at least one of the slightly acidic cation exchange resin and the weakly alkaline anion exchange resin, but may further include a strongly acidic cation exchange resin or a strongly alkaline anion exchange resin in addition to the slightly acidic cation exchange resin or the weakly alkaline anion exchange resin as a main component.

Also, the shapes of the slightly acidic cation exchange resin and the weakly alkaline anion exchange resin generally have a spherical shape in the embodiment, but may have a planar shape, a gel shape, or an irregular shape.

In the embodiment, the slightly acidic cation exchange resin and the weakly alkaline anion exchange resin are randomly accommodated in the resin chamber, but may be accommodated in the resin chamber in an ordered manner.

The slightly acidic cation exchange resin preferably has an exchange group other than the carboxylic group, and the weakly alkaline anion exchange resin may have an exchange group other than the primary to tertiary amino groups.

Also, it is not necessary that the all sizes of the ion exchange resin particles be the same, but it is preferable that an average particle size of the ion exchange resin accommodated in the resin chamber be from 100 μm to 500 μm.

In the embodiment, the resin chamber is configured so that water containing hardness components flows from a lower portion of the resin chamber toward an upper portion thereof, but the resin chamber may be configured so that the water flows from the upper portion to the lower portion or horizontally flows by rotating the device.

In addition, in the embodiment, a flowing direction of the above-described water is generally perpendicular to a direction of a current flowing in the resin chamber, but is not necessarily perpendicular and may be horizontal or slanted at a predetermined angle.

The pair of electrodes are provided in the embodiment, but a plurality of pairs of electrodes may be provided, and the electrodes may be either a soluble electrode or an insoluble electrode.

The cathode and the anode may be the same as or different from each other.

Also, when the ion exchange resin is regenerated, water prepared at a hardness of 250 mg/L as $CaCO_3$ is introduced from the introduction port in the embodiment, but the prepared hard water is not necessarily introduced and, for example, water that contains hardness components or water that does not contain hardness components may be introduced.

The first diaphragm and the second diaphragm may be membranes that have selective permeability, such as an ion exchange resin membrane and the like, and membranes that do not have selective permeability, such as a porous membrane and the like.

Also, the first diaphragm and the second diaphragm may be the same as or different from each other.

In addition, the present invention is not limited to the embodiments, and may be variously modified without departing from the spirit and scope of the invention.

Hereinafter, the present invention will be described in detail with reference to the embodiments of the present invention, and is not limited by the embodiments as long as they do not depart from essential characteristics of the present invention.

Embodiment 1

Embodiment 1 was the water softening device 100 described in FIG. 1.

The ion exchange resin 40 was a uniform mix of a slightly acidic cation exchange resin and a weakly alkaline anion exchange resin that had an adjusted particle size of 300 μm to 425 μm in an anhydrous state at a ratio of 3:1 as an ion-exchange capacity (meq/ml).

The anode 21 and the cathode 22 were platinum plated titanium electrodes with mesh shapes and had an electrode size of 5 cm×10 cm.

The first diaphragm 31 was a strongly alkaline anion exchange resin membrane with a thickness of 100 μm, and the second diaphragm 32 was a strongly acidic cation exchange resin membrane with a thickness of 100 μm.

That is, the water softening device 100 included a transparent polyvinyl chloride cartridge, and included 80 mL of the ion exchange resin 40, the anode 21, the cathode 22, the first diaphragm 31, and the second diaphragm 32 as a set.

Water to be treated was hard water with a hardness of 250 mg/L as calcium carbonate ($CaCO_3$).

The water to be treated was introduced from the introduction port 101 to the resin chamber 13 at a speed of 120 mL/min and discharged from the discharge port 102, and soft water was obtained (water softening).

Then, the same water to be treated was introduced to the resin chamber 13 from an inlet of the introduction port 101 as reclaimed water at a speed of 10 mL/min and simultaneously flowed between the anode 21 and the cathode 22 at a current density of 2 $A/dm^2$ for 30 minutes (electric regeneration).

In this case, the reclaimed water discharged from an outlet of the resin chamber 13 flowed through the anode chamber 11, and the reclaimed water discharged from the anode chamber 11 passed through the cathode chamber 12 again and was discharged out of the device. The softening-electricity regeneration process was repeated eight times.

Embodiment 2

Embodiment 2 was a water softening device 100 described in FIG. 4.

The ion exchange resin 40 was a uniform mix of a slightly acidic cation exchange resin and a weakly alkaline anion exchange resin that had an adjusted particle size of 300 μm to 425 μm in an anhydrous state at a ratio of 3:1 as an ion-exchange capacity (meq/ml).

The anode 21, the cathode 22, and the conductive member 50 were platinum plated titanium electrodes with mesh shapes and had an electrode size of 5 cm×10 cm.

The first diaphragms 31*a* and 31*b* were strongly alkaline anion exchange resin membranes with a thickness of 100 μm, and the second diaphragms 32*a* and 32*b* were strongly acidic cation exchange resin membranes with a thickness of 100 μm.

That is, the water softening device 100 included a transparent polyvinyl chloride, and included 160 mL (80 mL×2) of the ion exchange resin 40, the anode 21, the cathode 22, the first diaphragms 31*a* and 31*b*, and the second diaphragms 32*a* and 32*b* as a set.

Water to be treated was hard water with a hardness of 250 mg/L as calcium carbonate ($CaCO_3$).

The water to be treated was introduced from the introduction ports 101a and 101b to the resin chambers 13a and 13b at a speed of 120 mL/min and discharged from the discharge ports 102a and 102b, and soft water was obtained (water softening).

Then, the same water to be treated was introduced to the resin chambers 13a and 13b from inlets of the introduction ports 101a and 101b as reclaimed water at a speed of 10 mL/min and simultaneously flowed between the anode 21 and the cathode 22 at a current density of 2 A/dm² for 30 minutes (electric regeneration).

When a voltage was applied, the conductive member 50 became a bipolar electrode, a side of the anode 21 of the conductive member 50 formed a negative electrode, and a side of the cathode 22 formed a positive electrode. In this case, the water route was the same as described in FIG. 5.

The water softening-electricity regeneration process was repeated eight times.

Figure 6A:
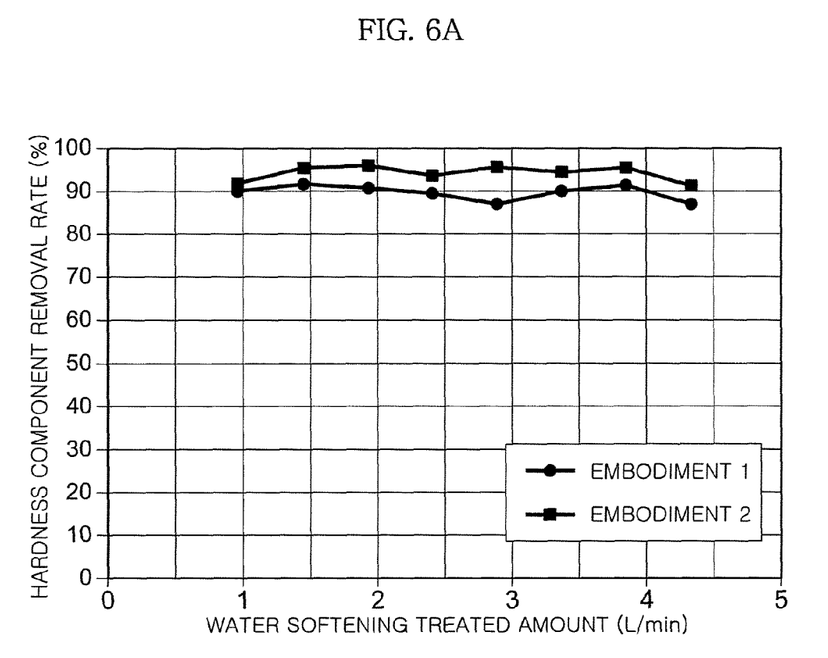
FIGS. 6(A) and (B) are views illustrating results of embodiments 1 and 2.
Figure 6B:
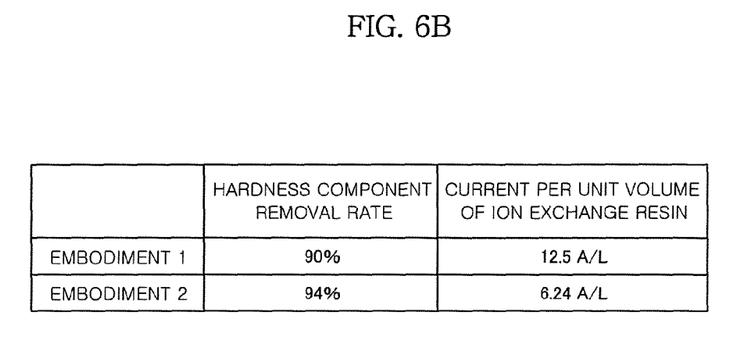

FIGS. 6(A) and 6(B) are experimental results of embodiment 1 and embodiment 2.

FIG. 6(A) shows a relation between a treated amount and a hardness component removal rate for embodiments 1 and 2.

Here, the horizontal axis represents the treated amount, and the vertical axis represents the hardness component removal rate.

In FIG. 6(A), the relation between the treated amount and the hardness component removal rate of each time water softening-electricity regeneration was conducted for embodiments 1 and 2 is shown.

Also, FIG. 6(B) shows the hardness component removal rates for embodiments 1 and 2 as an average value calculated from the result of FIG. 1.

Also, FIG. 6(B) shows a current flowing in the ion exchange resin 40 for each unit volume.

As described, a high hardness component removal rate was realized with embodiments 1 and 2.

Also, although embodiment 2 had a current per unit volume of the ion exchange resin 40 smaller than that of embodiment 1, embodiment 2 had a much higher hardness component removal rate.

That is a result of the installation of the conductive member 50.

Embodiment 3

Embodiment 3 was the water softening device 100 described in FIG. 1.

The configuration of the water softening device 100 was the same as in Embodiment 1.

Water to be treated was hard water with a hardness of 250 mg/L as calcium carbonate ($CaCO_3$).

The water to be treated was introduced into the resin chamber 13 from the introduction port 101 at a speed of 320 mL/min (SV=4 min−1) and discharged from the discharge port 102, and soft water was obtained (water softening).

Then, the same water to be treated was introduced into the resin chamber 13 from an inlet of the introduction port 101 as reclaimed water at a speed of 10 mL/min and simultaneously flowed between the anode 21 and the cathode 22 at a current density of 1 A/dm² for 30 minutes (electricity regeneration).

In this case, the reclaimed water discharged from the resin chamber 13 passed through the anode chamber 11, and the reclaimed water discharged from the anode chamber 11 was discharged out of the device through the cathode chamber 12. A process of water softening-electricity regeneration was repeated ten times.

Comparative Example 1

The water softening device 100 was shown in FIG. 1.

The configuration of the water softening device 100 was the same as in Embodiment 3 except that the ion exchange resin 40 was changed from a slightly acidic cation exchange resin and a weakly alkaline anion exchange resin to a strongly acidic cation exchange resin and a strongly alkaline anion exchange resin.

Water to be treated was treated in the same way as in Embodiment 3.

Figure 7:
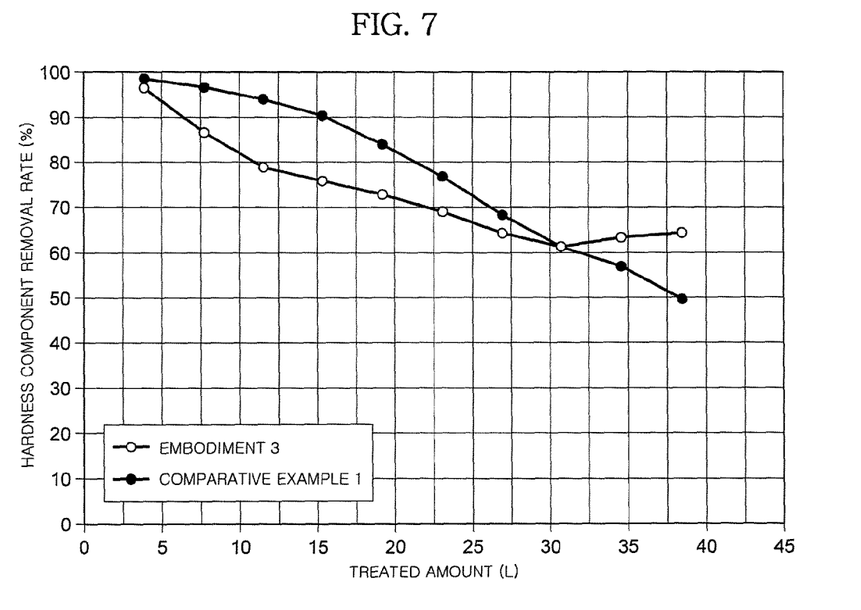
FIG. 7 is a view illustrating results of embodiment 3 and comparative example 1.

FIG. 7 shows results of Embodiment 3 and Comparative example 1.

FIG. 7 shows a relation between a treated amount and a hardness component removal rate for Embodiment 3 and Comparative example 1.

Here, the horizontal axis represents the treated amount, and the vertical axis represents the hardness component removal rate.

In FIG. 7, the relation between the treated amount and the hardness component removal rate of each time the water softening-electricity regeneration was performed for Embodiment 3 and Comparative example 1 is shown.

As shown, in Embodiment 3, the hardness component removal rate when the process of water softening-electricity regeneration was repeated 10 times was stabilized at about 66%.

Compared to that, the hardness component removal rate in the comparative example 1 showed a tendency to be less than about 50%.

Therefore, when the slightly acidic cation exchange resin and the weakly alkaline anion exchange resin were used, the ion exchange resin 40 was more easily regenerated and was less frequently exchanged when compared to the case where the strongly acidic cation exchange resin and the strongly alkaline anion exchange resin were used.

The invention claimed is:

1. A water softening device comprising:
   a pair of electrodes;
   a plurality of resin chambers disposed spaced apart from each other between the pair of electrodes;
   at least one conductive member disposed between each of the plurality of resin chambers; and
   a plurality of ion exchange resins provided in each of the plurality of resin chambers, made of at least one of a slightly acidic cation exchange resin and a weakly alkaline anion exchange resin, configured to soften water, and configured to be regenerated when a voltage is applied to the pair of electrodes,
   each of the plurality of ion exchange resins is configured to be regenerated for each unit divided by the conductive member.

2. The water softening device of claim 1, wherein the conductive member has non-permeability to ions or non-permeability to water.

3. The water softening device of claim 1, further comprising a plurality of first diaphragms disposed adjacent to the plurality of ion exchange resins, respectively, and configured to pass an anion therethrough when the ion exchange resins are regenerated; and
   a plurality of second diaphragms disposed adjacent to the plurality of ion exchange resins, respectively, and configured to pass a cation therethrough when the ion exchange resins are regenerated.

4. The water softening device of claim 1, further comprising passages respectively formed between the pair of electrodes and the plurality of ion exchange resins, and a passage formed between the conductive member and the plurality of ion exchange resins.

5. The water softening device of claim 1, wherein the slightly acidic cation exchange resin and the weakly alkaline anion exchange resin have a particle shape, are mixed and accommodated in the resin chambers, and have particle sizes of 100 µm to 500 µm, respectively.

6. The water softening device of claim 1, wherein an ion-exchange capacity of the slightly acidic cation exchange resin is one to nine times an ion-exchange capacity of the weakly alkaline anion exchange resin.

7. The water softening device of claim 1, further comprising a first diaphragm is a strongly alkaline anion exchange resin membrane, and a second diaphragm is a strongly acidic cation exchange resin membrane.

8. A water softening device comprising:
a pair of electrodes;
a resin chamber disposed between the pair of electrodes; and
an ion exchange resin provided in the resin chamber, includes of a slightly acidic cation exchange resin and a weakly alkaline anion exchange resin, configured to soften water, and configured to be regenerated when a voltage is applied to the pair of electrodes,
wherein an ion-exchange capacity of the slightly acidic cation exchange resin is one to nine times an ion-exchange capacity of the weakly alkaline anion exchange resin.

9. The water softening device of claim 8, further comprising: a first diaphragm disposed adjacent to the ion exchange resin, disposed apart from an anode of the pair of electrodes, and configured to pass an anion therethrough when the ion exchange resin is regenerated; and a second diaphragm disposed adjacent to the ion exchange resin, disposed spaced apart from a cathode of the pair of electrodes, and configured to pass a cation therethrough when the ion exchange resin is regenerated.

10. The water softening device of claim 8, wherein the slightly acidic cation exchange resin and the weakly alkaline anion exchange resin have particle shapes and are mixed and accommodated in the resin chamber.

11. The water softening device of claim 10, wherein the slightly acidic cation exchange resin and the weakly alkaline anion exchange resin have particle sizes of 100 µm to 500 µm, respectively.

12. The water softening device of claim 8, wherein an ion-exchange capacity of the slightly acidic cation exchange resin is one to nine times an ion-exchange capacity of the weakly alkaline anion exchange resin.

13. A method of regenerating an ion exchange resin, the method comprising:
applying a voltage to a pair of electrodes when a plurality of ion exchange resins in a plurality of resin chambers disposed between the pair of electrodes are regenerated;
introducing water into each of the plurality of resin chambers; and
discharging the water, which was introduced into the plurality of the resin chambers and passed through each of the ion exchange resins, to the outside;
wherein, regeneration of the plurality of ion exchange resins includes selectively regenerating the plurality of ion exchange resins based on a flow route of the water flowing in the plurality of resin chambers.

14. The method of claim 13, wherein the plurality of resin chambers are separated by conductive members disposed spaced apart from the plurality of ion exchange resins, and the selectively regenerating of the plurality of ion exchange resins includes selecting a plurality of first diaphragms respectively installed on both sides of the plurality of ion exchange resins and installed at an anode side of the electrodes, a plurality of second diaphragms installed at a cathode side, and a plurality of passages formed between the conductive members.

15. The method of claim 14, wherein the flow route of the water includes a route in which the water flows through at least one ion exchange resin, an anode chamber adjacent to the at least one ion exchange resin, and a cathode chamber adjacent to the least one ion exchange resin in that order, wherein the anode chamber is a space adjacent to an anode of in passages formed adjacent to the at least one ion exchange resin, and the cathode chamber is a space adjacent to a cathode in the passages formed adjacent to the at least one ion exchange resin.

16. The method of claim 13, wherein the introducing of the water into each of the plurality of resin chambers includes introducing part of the water introduced into at least one resin chamber and introducing remaining water into the remaining resin chambers.

17. The method of claim 13, wherein the plurality of ion exchange resins include a slightly acidic cation exchange resin and a weakly alkaline anion exchange resin mixed and accommodated in the plurality of resin chambers.

18. A method of regenerating an ion exchange resin provided in a water softening device, the method comprising:
introducing water into a resin chamber in which an ion exchange resin is accommodated when water is softened and discharging the introduced water to the outside when the water passes through the ion exchange resin, wherein the ion exchange resin comprises an acidic cation exchanged resin mixed with an alkaline anion exchange resin;
applying a voltage to electrodes respectively disposed on both sides of the resin chamber when the ion exchange resin is regenerated; and
introducing water to the resin chamber and discharging the water introduced into the resin chamber to the outside when the water passes through the ion exchange resin,
wherein the ion exchange resin includes a slightly acidic cation exchange resin and a weakly alkaline anion exchange resin,
wherein an ion-exchange capacity of the slightly acidic cation exchange resin is one to nine times an ion-exchange capacity of the weakly alkaline anion exchange resin.

19. The method of claim 18,
wherein regenerating of the ion exchange resin includes, when a hydrogen ion and a hydroxide ion are generated on an interface of the slightly acidic cation exchange resin and the weakly alkaline anion exchange resin by water decomposition, exchanging hardness components of an ion adsorbed on the slightly acidic cation exchange resin with the hydrogen ion and exchanging an anion component adsorbed on the weakly alkaline anion exchange resin with the hydroxide ion.

* * * * *

UNITED STATES PATENT AND TRADEMARK OFFICE
CERTIFICATE OF CORRECTION

PATENT NO.        : 9,815,713 B2
APPLICATION NO.   : 15/104210
DATED             : November 14, 2017
INVENTOR(S)       : Hiroto Ohnari et al.

It is certified that error appears in the above-identified patent and that said Letters Patent is hereby corrected as shown below:

On the Title Page

Item (72) Inventors, "Takeshi Okazaki" should be changed to --Tsuyoshi Okazaki--.

Signed and Sealed this
Thirteenth Day of November, 2018

Andrei Iancu
*Director of the United States Patent and Trademark Office*